(12) United States Patent
Ren et al.

(10) Patent No.: US 12,064,801 B2
(45) Date of Patent: Aug. 20, 2024

(54) IN-SITU SPRINGBACK COMPENSATION IN INCREMENTAL SHEET FORMING

(71) Applicant: Northwestern University, Evanston, IL (US)

(72) Inventors: Huaqing Ren, Santa Clara, CA (US); Jiaxi Xie, Evanston, IL (US); Shuheng Liao, Evanston, IL (US); Dohyun Leem, Evanston, IL (US); Jian Cao, Wilmette, IL (US); Kornel F. Ehmann, Evanston, IL (US)

(73) Assignee: Northwestern University, Evanston, IL (US)

( * ) Notice: Subject to any disclaimer, the term of this patent is extended or adjusted under 35 U.S.C. 154(b) by 413 days.

(21) Appl. No.: 17/430,452

(22) PCT Filed: Feb. 14, 2020

(86) PCT No.: PCT/US2020/018317
§ 371 (c)(1),
(2) Date: Aug. 12, 2021

(87) PCT Pub. No.: WO2020/168211
PCT Pub. Date: Aug. 20, 2020

(65) Prior Publication Data
US 2022/0118501 A1 Apr. 21, 2022

Related U.S. Application Data

(60) Provisional application No. 62/805,759, filed on Feb. 14, 2019.

(51) Int. Cl.
*B21D 31/00* (2006.01)
*G05B 19/404* (2006.01)

(52) U.S. Cl.
CPC ......... *B21D 31/005* (2013.01); *G05B 19/404* (2013.01); *G05B 2219/45234* (2013.01)

(58) Field of Classification Search
CPC ............... B21D 31/005; G05B 19/404; G05B 2219/37403; G05B 2219/37405;
(Continued)

(56) References Cited

U.S. PATENT DOCUMENTS 5,483,750 A * 1/1996 Ooenoki .................. B21D 5/02
33/534
8,545,142 B2 * 10/2013 Smith .................... B21D 22/18
409/80

(Continued)

OTHER PUBLICATIONS

Lu et al. "Model predictive control of incremental sheet forming for geometric accuracy improvement", Jul. 2015.*
(Continued)

*Primary Examiner* — Edward T Tolan
(74) *Attorney, Agent, or Firm* — Banner & Witcoff, Ltd.

(57) ABSTRACT

Novel systems and methods for an incremental forming process to manufacture a product are disclosed herein. The system and method generally involves continuously modifying the toolpath in real-time based upon the forming force of the forming tool compared to a predicted springback error established offline from a series of simplified simulations. The system and method disclosed herein are effective to form products with complex geometries and minimizes the costs and time requirements associated with prior art techniques.

20 Claims, 12 Drawing Sheets

(58) Field of Classification Search
CPC .......... G05B 2219/37411; G05B 2219/45234;
G05B 2219/45152; G06F 2113/24
See application file for complete search history.

(56) References Cited

U.S. PATENT DOCUMENTS

| | | | |
|---|---|---|---|
| 9,767,234 B2 * | 9/2017 | Yoshida | G06F 30/23 |
| 10,089,422 B2 * | 10/2018 | Sumikawa | G06F 17/16 |
| 2012/0055217 A1 * | 3/2012 | Roth | C21D 9/0018 |
| | | | 72/54 |
| 2013/0103177 A1 * | 4/2013 | Cao | B21D 31/005 |
| | | | 700/98 |
| 2014/0150510 A1 * | 6/2014 | Beltran | B21D 31/005 |
| | | | 72/19.1 |
| 2015/0134093 A1 | 5/2015 | Dos Reis Alipio Da Cruz | |
| 2016/0288184 A1 | 10/2016 | Zhao et al. | |
| 2018/0264538 A1 | 9/2018 | Roth | |

OTHER PUBLICATIONS

CN 106493216A, Chu et al. Mar. 2017.*
CN 106670297A, Li et al. May 2017.*
Fiorentino et al. "Part precision improvement in incremental sheet forming" Mar. 2015.*
May 27, 2020—(WO) ISR and WO—App. No. PCT/US2020/018317.
Zhang et al.—'A Mixed Double-Sided Incremental Forming Toolpath Strategy for Improved Geometric Accuracy'—Journal of Manufacturing Science and Engineering, pp. 1-7, Sep. 4, 2015.

* cited by examiner

IN-SITU SPRINGBACK COMPENSATION IN INCREMENTAL SHEET FORMING

RELATED APPLICATION DATA

This application is a U.S. National Stage application under 35 U.S.C. § 371 of International Application PCT/US2020/018317, filed Feb. 14, 2020, which claims priority to U.S. Provisional Patent Application No. 62/805,759, filed Feb. 14, 2019, and entitled "In-Situ Springback Compensation in Incremental Sheet Forming," the disclosures of which are incorporated herein by reference in their entirety for any and all non-limiting purposes.

STATEMENT REGARDING FEDERALLY-SPONSORED RESEARCH

This invention was made with government support under DODONR N00014-14-2-0002-LIFT 0007A-4, Agile-4 awarded by the U.S. Department of Defense Office of Naval Research LIFT Manufacturing Institute and an Energy Efficiency & Renewable Energy program (EERE) Student Fellowship awarded by the U.S. Department of Energy. The government has certain rights in the invention.

BACKGROUND

Aspects of the disclosure relate to a simulation-based in-situ springback compensation system and method for incremental sheet forming, which continuously modifies a toolpath based on in-situ or in-process forming forces and a meta-model established offline from a series of simplified simulations to predict material springback error induced geometries.

SUMMARY

Limited geometric accuracy in incremental sheet forming (ISF) is a major obstacle for its wide adoption in industry. Aspects of the disclosure relate to addressing one of the main causes of geometric inaccuracy, i.e., in-process springback. This disclosure generally promotes efficient and robust geometric error reduction for various ISF methods and various geometries with negligible setup cost by attenuating or eliminating the errors associated with in-process springback.

In certain embodiments, a system for incremental sheet forming is disclosed herein that may include a forming tool that may be configured to deform a material in an incremental forming process to manufacture a product, a force sensor that may be configured to measure a forming force of the forming tool, at least one processor, and at least one memory storing computer executable instructions. In certain examples, when executed by the at least one processor, the computer executable instructions may cause the system to calculate a predicted springback error of the material, engage the forming tool with the material in the incremental forming process, record the forming force during the incremental forming process, and determine an in-situ compensation wherein the in-situ compensation reduces geometric error in forming the product. In one example, the material may be a metal, a polymer, or a composite. In other examples, the forming tool may be further configured to shape a metal, a polymer, or a composite.

In certain examples, the forming tool may be further configured to move along a toolpath comprising a set of toolpath points, wherein the toolpath is determined in part by a geometry of the product. In other examples, the predicted springback error of the material may be determined for a plurality of control points. In some examples, the plurality of control points may run along the toolpath. In still other examples, the forming force may be measured and recorded at each toolpath point, and the in-situ compensation may be determined by comparing the forming force to the predicted springback error at a corresponding control point. In yet other examples, a depth of the toolpath may be modified based upon the determined in-situ compensation. In one example, the incremental forming process may be single-point incremental forming. In another example, the system may further include a supporting tool configured to facilitate double-sided incremental forming.

In another embodiment disclosed herein, a method is disclosed herein for the manufacturing a product in an incremental forming process including providing a forming tool that may be configured to deform a material, providing a force sensor that may be configured to measure a forming force of the forming tool, and providing at least one processor that may be configured to execute instructions stored by at least one memory. In some examples, the instructions may cause the processor to calculate a predicted springback error of the material, engage the forming tool with the material in the incremental forming process, record the forming force during the incremental forming process, and determine an in-situ compensation that may reduce geometric error in forming the product. In other examples, the material may be a metal, a polymer, or a composite. In some examples, the forming tool may be further configured to shape a metal, a polymer, or a composite.

In still other examples, the forming tool may be further configured to move along a toolpath comprising a set of toolpath points. In one example, the toolpath may be determined in part by a geometry of the product. In yet other examples, the predicted springback error of the material may be determined for a plurality of control points. In other examples, the plurality of control points may run along the toolpath. In other examples, the forming force may be measured and recorded at each toolpath point, and the in-situ compensation may be determined by comparing the forming force to the predicted springback error at a corresponding control point. In some examples, a depth of the toolpath may be modified based upon the determined in-situ compensation. In yet other examples, the incremental forming process may be single-point incremental forming. In another example, the method may further include a supporting tool configured to facilitate double-sided incremental forming.

In other embodiments, as disclosed herein, a non-transitory machine-readable medium storing instructions that, when executed by one or more processors, may cause the one or more processors to engage the forming tool with the material in the incremental forming process, record a forming force produced by a forming tool, the forming force may be measured by a force sensor, and the forming tool may deform a material to manufacture a product in an incremental forming process, calculate a predicted springback error of a material, and determine an in-situ compensation that reduces geometric error in forming the product.

In other examples, the non-transitory machine-readable medium storing instructions may further cause the one or more processors to define a toolpath comprising a set of tool path points, wherein the toolpath is determined in part by a geometry of the product, configure the forming tool to move along the toolpath, define a plurality of control points that run along the toolpath, calculate the predicted the springback error of the material for the plurality of control points, record the forming force at each toolpath point, compare the forming force at each toolpath point to the predicted springback error at a corresponding control point, determine the in-situ compensation, and modify a depth of the toolpath based upon the determined in-situ compensation.

These features, along with many others, are discussed in greater detail below.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present disclosure is illustrated by way of example and not limited in the accompanying figures in which like reference numerals indicate similar elements and in which:

FIGS. 1A-1D depict part geometry in various incremental sheet forming (ISF) stages: FIG. 1A during forming; FIG. 1B after tool release; FIG. 1C upon unclamping; and FIG. 1D after trimming.

FIGS. 2A-2B depict an illustration of springback compensation: FIG. 2A pre-defined toolpath without compensation; and FIG. 2B modified toolpath.

FIGS. 4A-4C depict clustering results of control points (circles) and segments (colored regions) in: FIG. 4A cone; FIG. 4B fish fin; and FIG. 4C round corner pyramid.

FIGS. 5A-5B depict a comparison of force-tool position curve between tool-lifting and tool-returning process with $z_{pre}$ at: FIG. 5A 8.2 mm depth, and FIG. 5B 19.2 mm depth.

DETAILED DESCRIPTION

Incremental sheet forming (ISF) is a sheet metal forming technique in which a sheet of metal is formed into a final product by a series of small incremental deformations typically using a round tipped tool. Studies have shown that ISF may be applied to a polymer and/or composite sheets as well. ISF has the potential to meet modern demands of rapid, flexible, and relatively low-cost manufacturing of sheet metal products and possibly polymer or composite products. However, the adoption of the ISF process in industry is largely hampered by its limited geometric accuracy due to multiple sources, e.g., tool compliance, addressed through active force control [0060], and springback. In essence, the desired product formed in the ISF product is limited due to errors associated with deforming the material resulting in geometric errors to the desired product. Springback errors result from the elasticity of a material. In some circumstances, the forming tool imparts a force on the material to deform it into the desired shape, however, the desired shape geometry changes. As the forming tool is retracted, moved, or lifted off of the surface of the material, the material partly returns to its original shape due to elasticity of the material. As the most significant source of geometric deviation, as shown in FIGS. 1A-1D, springback originates from: shape deviations during the forming process including the final lift off of the tools (Stages a (FIG. 1A) and b (FIG. 1B)), springback upon the removal of the clamps after forming (Stage c (FIG. 1C)), and further springback in the trimming process (Stage d (FIG. 1D)). Prior research has shown that springback that occurs in both Stages c (unclamping) and d (trimming) can be effectively reduced by thermal annealing [0061]. As such, one goal of the disclosed invention is to provide for a general system and method of ISF that enhances the geometric accuracy during the forming process (i.e., at the end of Stage b) when forming an arbitrary geometry for the first time. Such a capability eliminates the additional time requirements in current ISF methods and systems employing an iterative process to repeatedly deform a material with a forming tool to achieve the desired geometry of a product.

One strategy to alleviate or attenuate springback is to over compensate during forming with the forming tool by intentionally applying additional deformation to the sheet in the forming process, i.e., applying a greater forming force to account for the expected elasticity of the material. As partly described above, the most common compensation method to minimize springback is iterative forming, i.e., using offline measurement data from formed parts to correct the toolpath in the following forming operation [3]. Again, this prior art technique and method requires multiple loops of trial and error even for a simple geometry and increases manufacturing times and ultimately costs [4].

To avoid the steps needed in iterative forming, a measurement-based compensation method using an in-situ stereo scanner was developed for single point incremental forming (SPIF) [5], where the geometric deviation was captured by a camera and used as a baseline for compensating the following or subsequent toolpath required to eliminate the geometric errors. The toolpath is the path taken by the forming tool along the material to deform the material into the desired product. The toolpath may include a set of various toolpath points as determined by the geometry of the product. Further, the toolpath and related toolpath points may include an xy-plane and a z-axis, where the z-axis may be defined by a depth. However, the method was for achieving an accurate shape at the end of Stage a (see FIG. 1A) and did not take geometric deviations in Stage b (see FIG. 1B) into consideration-thus the requirement for an iterative process. Additionally, a response function to correlate the part shape deviation and the resultant toolpath modification in the iterative process required to form a complex geometry is, in most cases, extremely difficult to calculate. Further, the utilization of a camera to capture geometric errors is typically incompatible with a die or a bottom tool, i.e., a forming tool, because it introduces other intrinsic limitations limiting its adoption as an effective means to eliminate the geometric errors.

Accordingly, the present disclosure generally relates to a simulation-based in-situ springback compensation system and related methods of forming or manufacturing products via ISF. In a typical example disclosed herein, the system and method involves continuously modifying the toolpath in real-time based on the in-situ forming force of the forming tool, and a meta-model predicting springback error established offline from a series of simplified simulations. The system and method disclosed herein are effective to form products with complex geometries and minimizes the costs and time requirements associated with prior art techniques.

In the following disclosure, the term 'point' or 'toolpath point' may denote a position on the toolpath. The coordinate reference frame is set as in FIGS. 1A-1D, where the z-axis is parallel to the longitudinal axis of the forming tool and the xy-plane is the sheet plane. As noted above, the z-axis may include a depth or be defined by a depth.

Figure 1A:
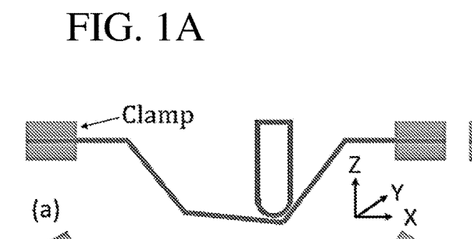
Figure 1B:
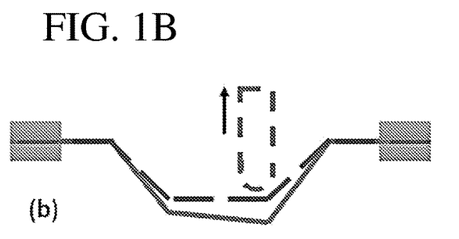
Figure 1C:
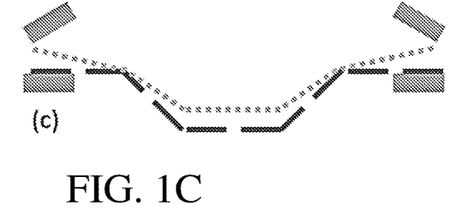
Figure 1D:
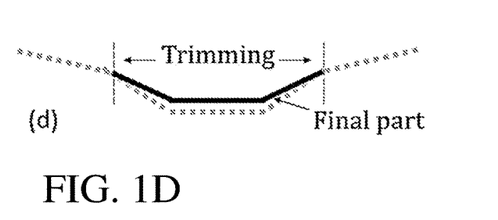
Figure 2A:
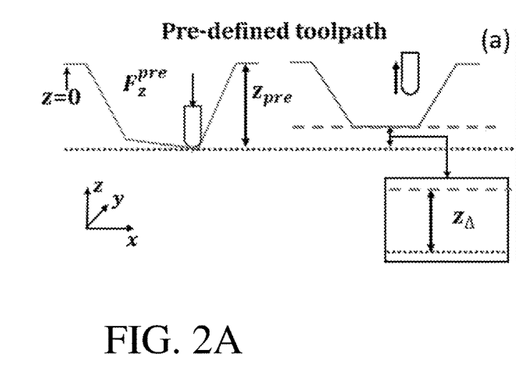

In an ISF process, the forming tool moves along a pre-defined toolpath generated for a target geometry. The toolpath may include a plurality of toolpath points. The toolpath and/or the toolpath points may be defined by the geometry of the desired product. The toolpath and/or the toolpath points may be defined by an xy-plane and/or a z-axis. At an arbitrary point p on the pre-defined toolpath, where $p=(x_{pre}, y_{pre}, z_{pre})$, if the forming tool is stopped and lifted from the sheet then an in-situ springback occurs. The 'in-situ springback displacement,' denoted by $z_\Delta$, is defined as the difference between $z_{pre}$ and the depth of the corresponding point of the recovered sheet after springback, as shown in FIG. 2A.

Assuming that springback is purely elastic and plastic deformation only occurs in a small area around the tool contact point, $z_\Delta$ is the height deviation from the point on the final part geometry formed by the pre-defined toolpath to the corresponding point on the desired part geometry, i.e., the shape deviation at the end of Stage b, a positive number in the current coordinate system. Thus, if $z_\Delta$ at an arbitrary location of a pre-defined toolpath can be predicted a priori based on the forming force of the forming tool at that location, i.e., $z_\Delta(F_z; p)$, then the pre-defined toolpath can be modified in-situ, i.e., real-time, if the forming force is known and/or measured. Denoting the vertical forming force by $F_z$, the modified depth $z_{mod}$ can be calculated as:

$$z_{mod}=z_{pre}-z_\Delta(F_z;p) \quad (1)$$

Figure 2B:
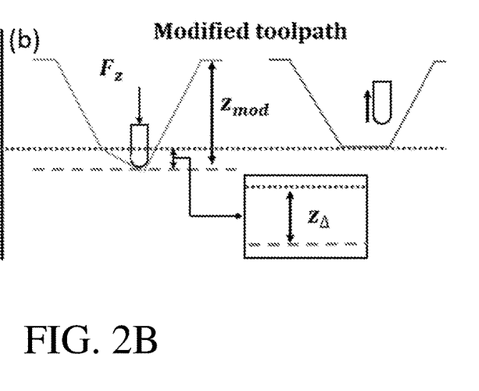

The compensation methodology is illustrated in FIG. 2B. Since the major source of springback in ISF is global bending, only the z-components of the shape deviation and of the forming force are considered. However, deviations in the xy-plane may be measured and used to further refine geometric accuracy and minimization of errors in certain embodiments.

Figure 3A:
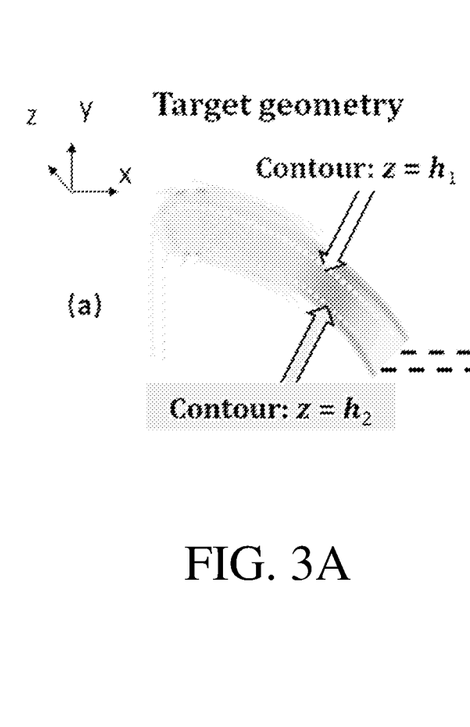
FIGS. 3A-3C depict intermediate geometries and their control points.
Figure 3B:
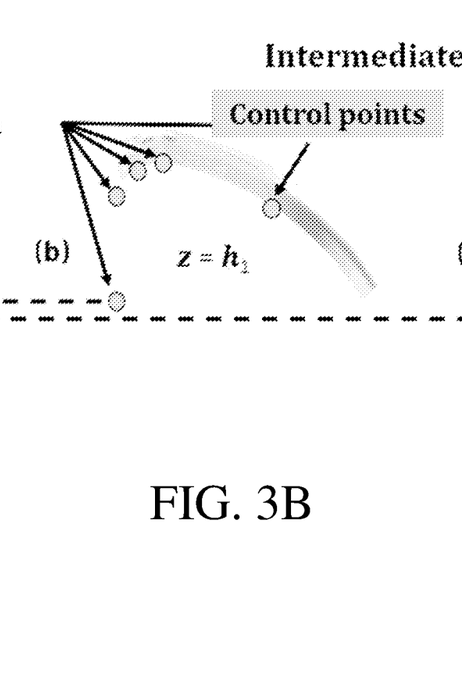
Figure 3C:
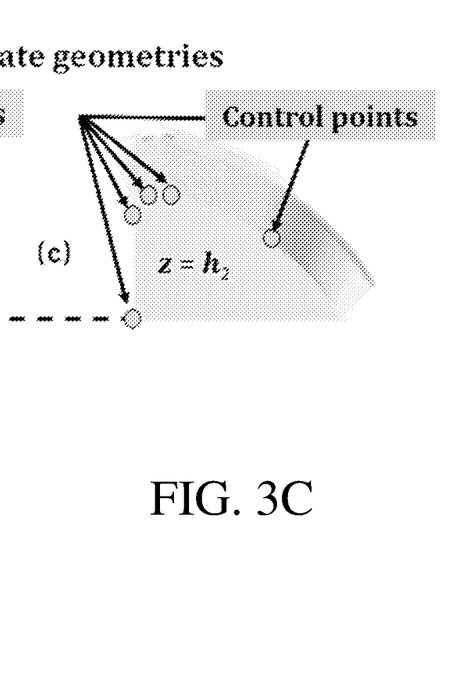

Since springback is assumed to be elastic, $z_\Delta(F_z; p)$ can be calculated by solving a simple elastic bending problem, where a vertical point load $F_z$ acts at p on an intermediate geometry and $z_\Delta$ is the deflection at p. Thus, for each point p, an offline numerical simulation can be performed to calculate the response function between $z_\Delta$ and $F_z$. However, it is unrealistic and undesired to do the computation for all values of p along a toolpath. Besides, the trend of $z_\Delta(F_z; p)$ will only slightly change in the area of one point, hence, it is unnecessary to perform the simulation at every point. Therefore, the offline preparation for $z_\Delta(F_z; p)$ may consist of 3 steps:

Step 1: For a given target geometry, slice the desired geometry into contours with a user-defined depth interval h, which can be a number equal or smaller than the smallest geometric feature in the z-direction, as shown in FIG. 3A. For each contour, generate the corresponding intermediate geometry at the associated height as shown in FIG. 3B or FIG. 3C. These intermediate geometries will be used as part geometries in the finite element simulations to calculate $z_\Delta(F_z; p)$ in Step 3.

Step 2: For each intermediate geometry, select control points as representative points p to be used in later simulations, as shown in FIG. 3B or 3C. A clustering algorithm is utilized to determine the locations of these control points based on the similarity of several key geometric parameters. The various control points will typically coincide or run along the actual toolpath needed to form the desired geometry. The control points may or may not coincide with the actual toolpath point contacted by the forming tool.

Step 3: For each control point, solve the corresponding elastic deformation problem using finite element (FE) simulations to determine $z_\Delta(F_z; p)$. For all other points in a contour, $z_\Delta(F_z; p)$ is obtained by a simple interpolation between the responses at two neighboring control points. Each contour, obtained by slicing in Step 1, can be considered as a set of all the pre-defined toolpath points required to form a desired geometry, i.e., product, with the same corresponding depth, i.e., z-axis. A segment may be defined as a subset of the contour, which contains one or many points. Hence, the union of all segments is the contour itself. Partitioning is the action that defines individual segments in a contour. Once partitioning is finalized, all points in a segment should have similar key geometric parameters. Considering the nature of the ISF process, three non-limiting geometric parameters may be chosen to represent a point, toolpath point, and/or contact point:
(i) the minimum distance from the point to the clamped boundaries, denoted by l;
(ii) local wall angle, denoted by $\alpha$, and
(iii) the contour curvature at the point, denoted by $\kappa$.

Control points may be determined as the center point and two boundary points of each segment.

Each point in the contour can be mapped to an element in a virtual array $\chi$ as:

$$\chi=[n,(l/l_0),(\alpha/\alpha_0),(\kappa/\kappa_0)] \quad (2)$$

where n is the label of the segment to which the point belongs, and $l_0$, $\alpha_0$, and $\kappa_0$ are pre-defined normalization parameters characterizing the maximum acceptable variances of the corresponding variables in a segment.

For each contour, a constraint agglomerative hierarchical clustering algorithm is utilized to generate a 'best' partition that accurately represents the geometry with a minimum number of segments. This has been much investigated in the field of classification in statistics.

For each pair of segments i and j, Ward's distance d(i, j) can be defined as the product between a factor of segment sizes and a factor of the difference of the segment centroids:

$$d(i,\ j) = \frac{N_i N_j}{N_i + N_j}\|\overline{X}_i - \overline{X}_j\| \quad (3)$$

where $N_i$ is the number of points in segment i, and $\overline{X}_i$ is the centroid of the segment i. The same naming convention applies to the subscript j as well.

At the beginning of the algorithm, each point in the contour is considered as a one-point segment to compose the initial partition. Next, the two segments with the smallest Ward's distance defined by Eq. (3) are merged into a new segment. At the same time, the Calinski-Harabasz (CH) index is recorded to characterize the ratio of within-cluster variation over between-cluster variation. Repeating the above merging step, the initial one-point segments are merged into larger and larger clusters until only one segment is left, containing all the contour points. The partition with the minimal CH index is chosen to be the 'best' partition.

Figure 4A:
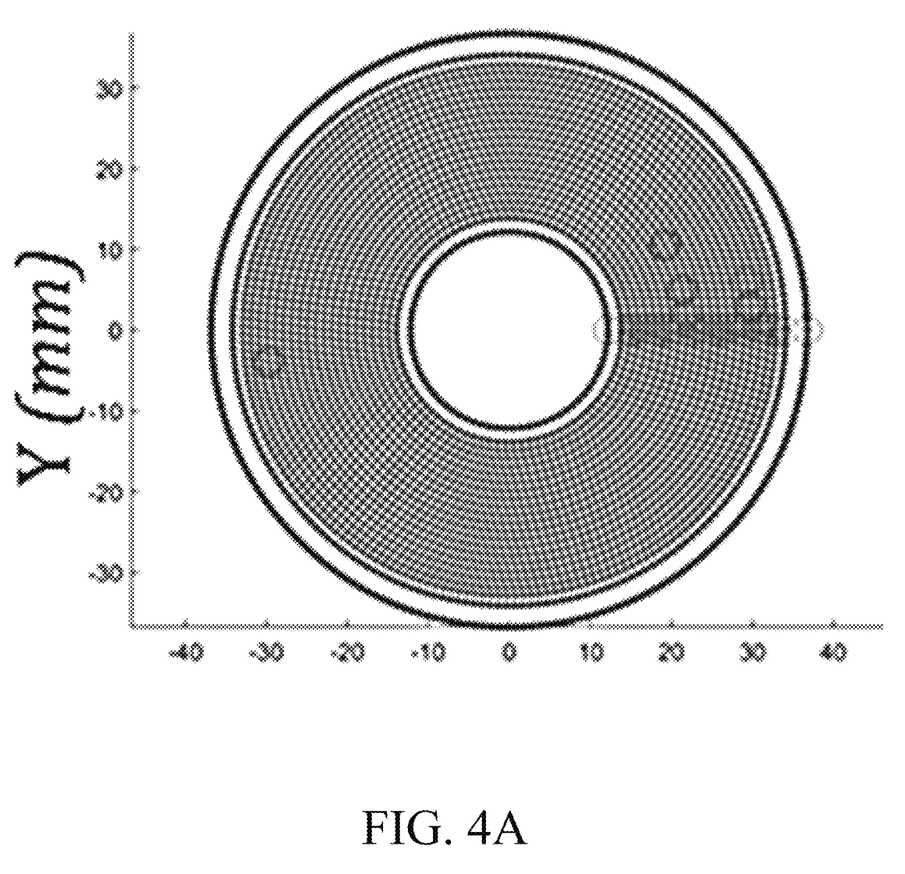
Figure 4B:
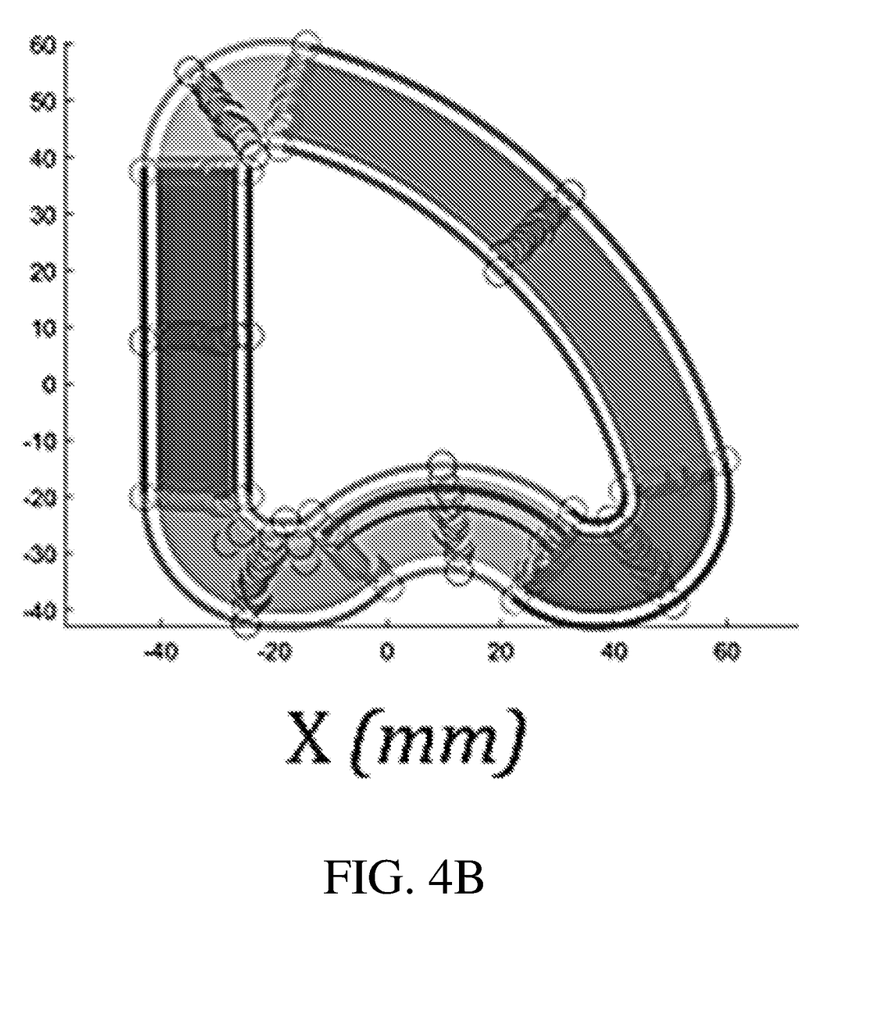
Figure 4C:
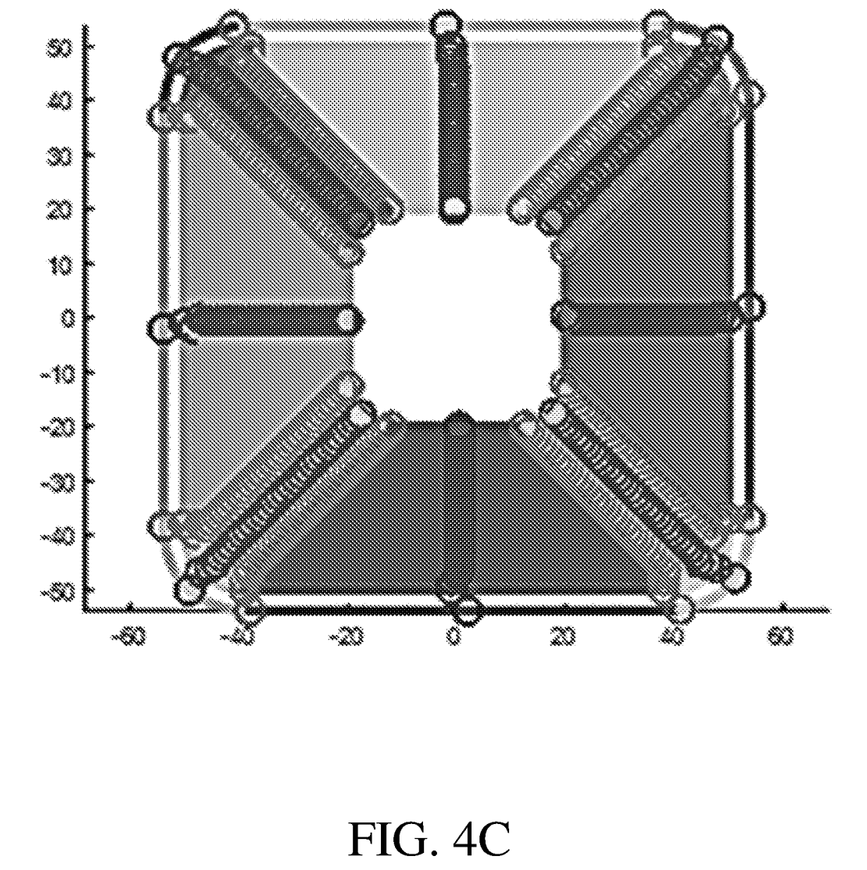

The partitioning results for a cone, a fish fin, and a round cornered pyramid using the above clustering algorithm and key geometric parameters defined above are shown in FIGS. 4A-4C, in which different colors represent different segments while circles represent the location of the control points. Note that FIGS. 4A-4C are two-dimensional projections of a three-dimensional objects, which contains multiple contours at different z heights/depths.

The methodology presented above can be used in general ISF processes. The Double-Sided Incremental Forming (DSIF) process can also be used to demonstrate the effectiveness of the approach. DSIF uses two generic tools, a forming tool on one side of the sheet and a supporting tool on the other side. The forming tool moves along the input toolpath to form a sheet metal by deformation to a desired geometry, while the supporting tool moves accordingly to keep the sheet locally supported. The supporting tool offers additional flexibility to an ISF process in terms of geometry complexity and the ability to apply a squeezing force to the sheet which can be explicitly controlled by a force control algorithm [0060].

To verify the assumption that springback is purely elastic, a tool-lift experiment can be performed. During a DSIF process, the movement of the tools is paused when it reaches a pre-determined depth or height. The forming force in the z-direction is recorded as $F_z$ and the depth of the tooltip as $z_{pre}$. Next, the tool is lifted until the force decreases to 0 N and the new depth, $z_{pre}+z_\Delta$, is recorded. Finally, the tool is pushed back to $z_{pre}$ and the force in the z-direction is recorded as $F_z'$.

Figure 5A:
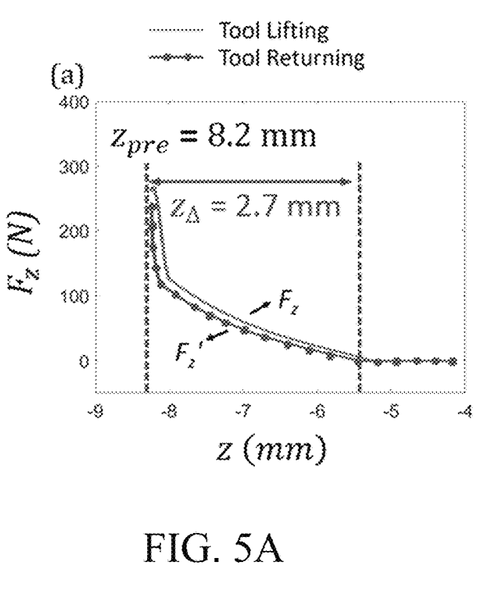
Figure 5B:
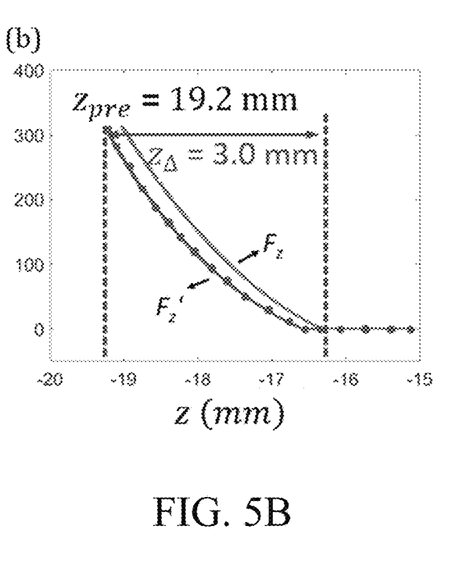

This may be conducted on a 45° cone as the target geometry. The material is, for example, a 1 mm thick AA5754-O sheet with an effective forming area of 250 mm×250 mm. As the tools proceed along their pre-defined toolpaths, the forming process is periodically paused to perform the tool-lift experiments as described above. FIG. 5 shows, for example, the force hysteresis at two sample depths. Note that the recorded $F_z$ and $F_z'$ in this example are very close to each other, which justifies the assumption.

With the above verification, calculating $z_\Delta$ as a function of $F_z$ at each control point p becomes a simple elastic deformation problem where a point load is applied at p on its corresponding intermediate geometry.

Figure 6:
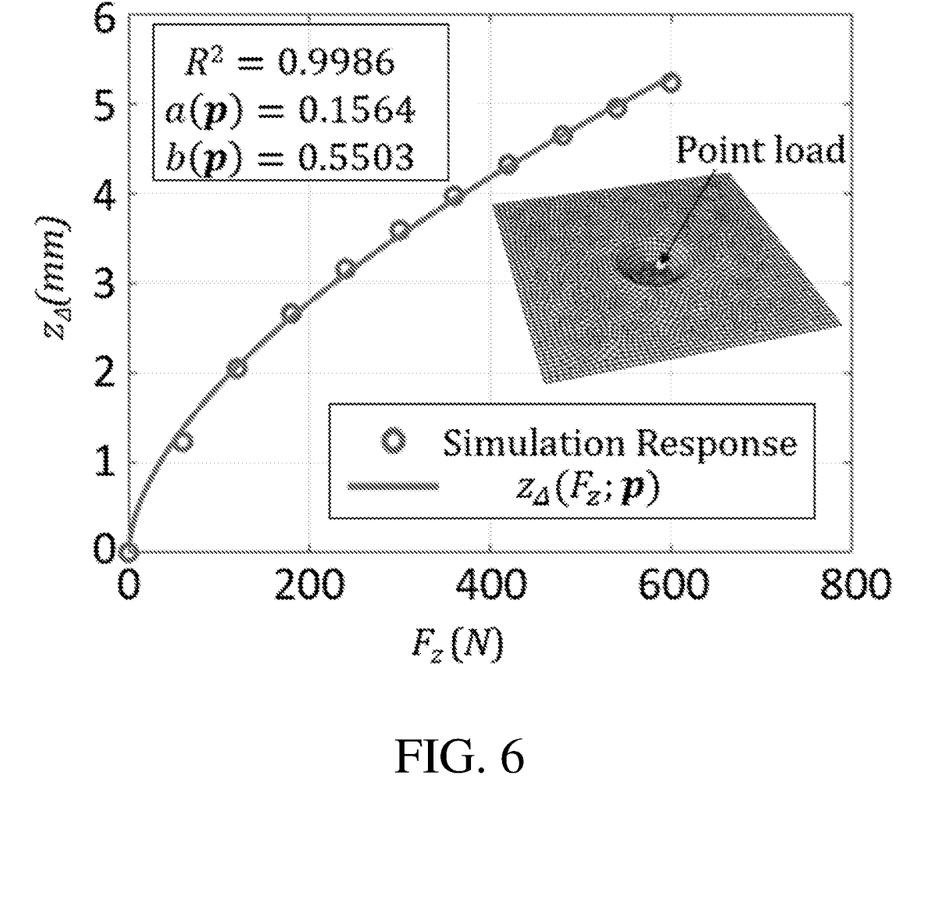
FIG. 6 depicts an evaluation of $z_A(F; p)$ function constructed for an intermediate cone geometry (depth=14 mm).

ABAQUS/Explicit can be used as the numerical tool to calculate $z_\Delta$. For each control point, $z_\Delta$ is calculated by applying $F_z$ within the usual force range observed in DSIF, e.g., 0-600 N for forming 1 mm thick aluminum alloy AA5754-O. Once the displacement-force response pair is obtained from the simulation, $z_\Delta$ can be fitted by a power function:

$$z_\Delta(F;p)=a(p)F_z^{b(p)} \quad (4)$$

where a(p) and b(p) are two fitted stiffness parameters at p. A sample response of $z_\Delta(F; p)$ from an intermediate cone geometry with 14 mm depth is shown in FIG. 6, while the location of the control point for this geometry is shown in FIG. 4A. Note that the $z_\Delta(F; p)$ function with a(p) and b(p) fitted shows a good agreement with the $z_\Delta$ values obtained from the simulation.

The total number of such elastic deformation simulations needed for an arbitrary geometry equals to the total number of control points, however, only one finite element mesh needs to be constructed for each contour level, denoted as an intermediate geometry in FIGS. 3A-3C and illustrated as the insert in FIG. 6. The power function in Eq. (4) is used to represent the functions of $z_\Delta(F; p)$ at all control points. For any other points, a(p) and b(p) are interpolated linearly from neighboring control points.

Figure 7:
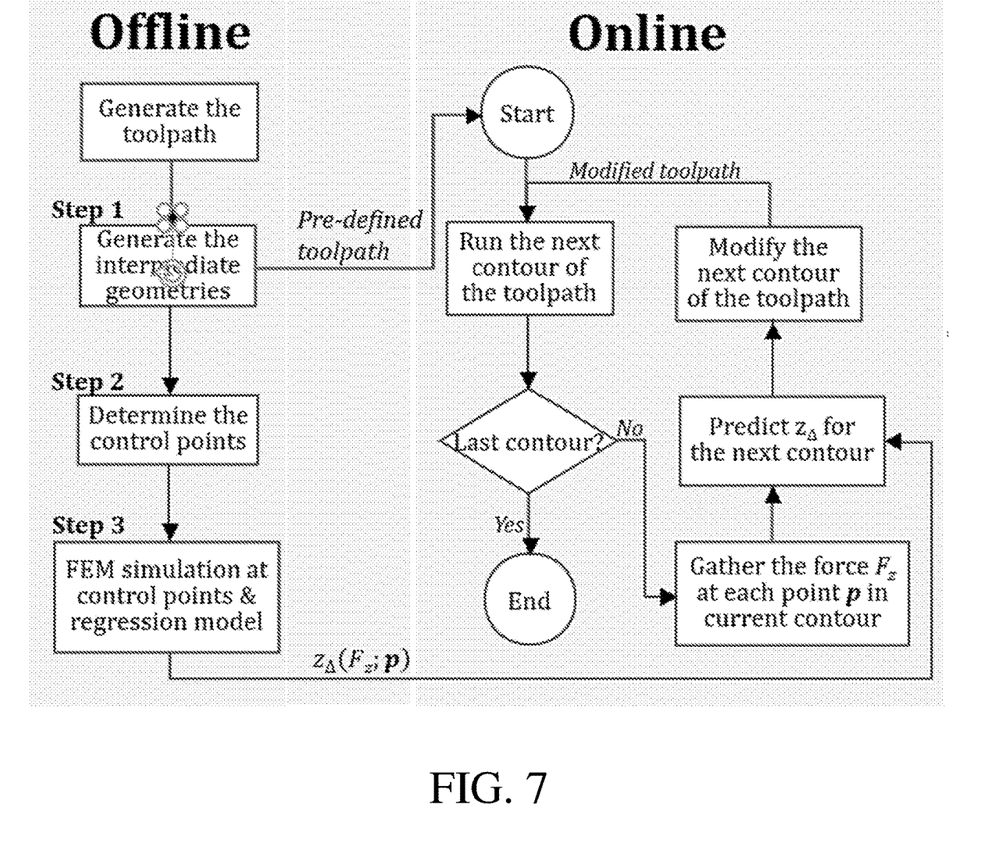
FIG. 7 depicts a flow chart of the in-situ springback compensation method.

Following the methodology described above, one can obtain the function $z_\Delta(F; p)$ for every toolpath point in the offline mode, before any physical experimentation, by constructing finite element models for each intermediate geometry based on the required geometry resolution (Step 1), analyzing each intermediate geometry to determine the control points (Step 2), performing elastic numerical simulations at each control point to obtain the relationship between force and deflection, and creating $z_\Delta(F; p)$ for every toolpath point by a simple interpolation between the responses at two neighboring control points (Step 3). Then, online compensation can be performed at every point in the toolpath based on Eq. (1). FIG. 7 is a flow chart describing the required steps for the integration of the online compensation algorithm with the offline preparation of the in-situ springback compensation system and method disclosed herein.

In order to enhance the robustness of the method, a series of filters may be added to the system and method. The filters may include, for example, 1) a force filter to avoid noise in the forming force measurement and recording; 2) a gradient filter to limit the maximum change of the compensation values between adjacent toolpath points in each contour; and 3) a filter to limit the change of the average compensation value in adjacent contours. Note that the system and method disclosed herein are also applicable to spiral toolpaths.

To demonstrate the effectiveness of the disclosed compensation method, three different geometries were formed. For example, geometries includes 1) a truncated cone; 2) a fish fin, and 3) a truncated pyramid with round corners. All parts were formed with 5.0 mm radius tools at a tool speed of 5.0 mm/s. All the toolpaths were spiral, with a 0.2 mm incremental depth per cycle and a 0.5 mm step size. Once a part was formed, a laser scanner mounted on a Romer Absolute Arm 7535 SI from Hexagon Manufacturing Intelligence with an overall system accuracy of 0.10 mm was used to scan the upper surface of the clamped part.

The experimental results are summarized in Table 1 where 'Ref' denotes the original DSIF part without any closed-loop control or springback compensation, 'SC' denotes forming with the proposed springback compensation algorithm only, and 'SC+FC' denotes forming with both springback compensation and force control developed in a previous work [0060]. The force control was utilized to prevent the bottom tool from potentially losing contact with the deformed part due to the change of sheet thickness in forming.

Figure 8:
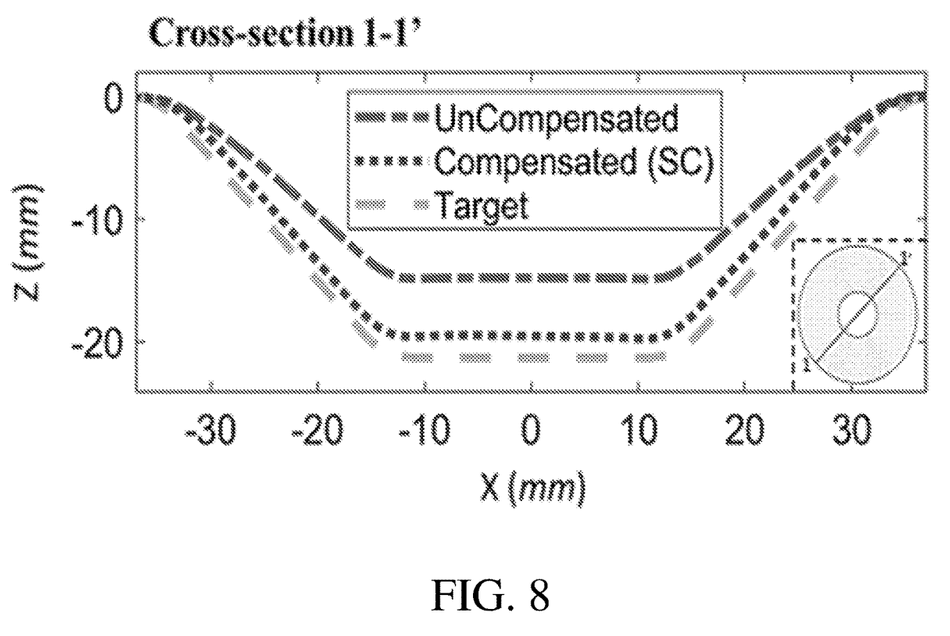
FIG. 8 depicts the cross-section view (x-z plane) of the truncated cone parts.
Figure 9A:
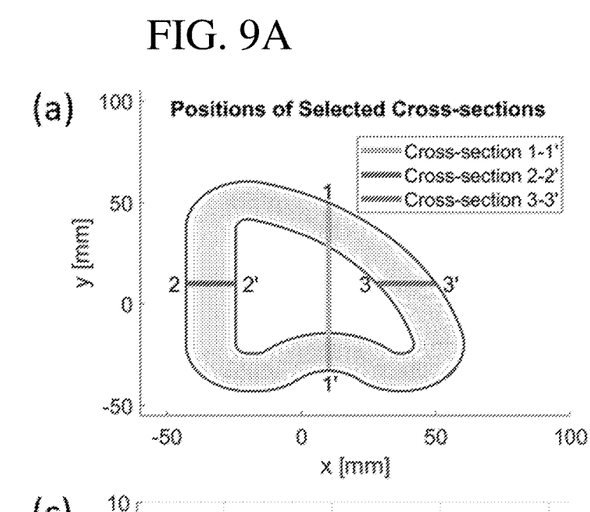
FIG. 9A depicts positions of the selected cross-sections.
Figure 9B:
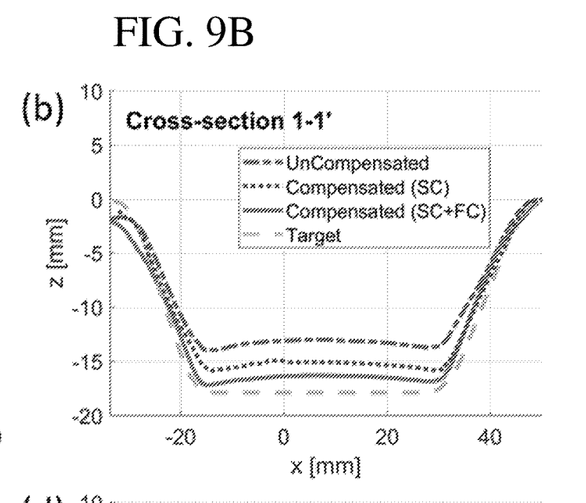
FIGS. 9B-9D depict the cross-section views of the fish fin part.
Figure 9C:
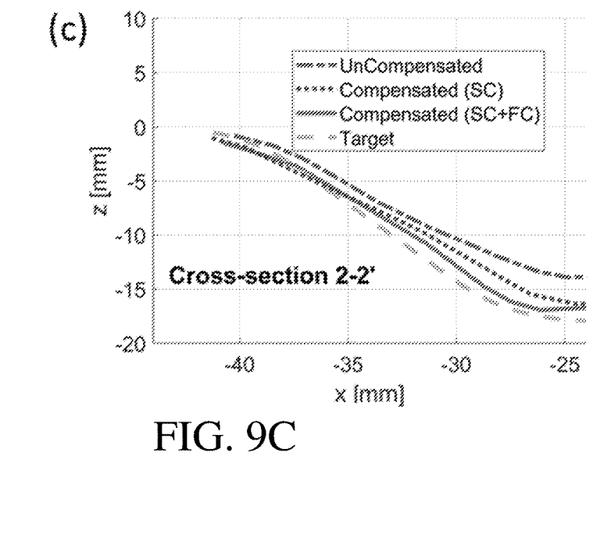
Figure 9D:
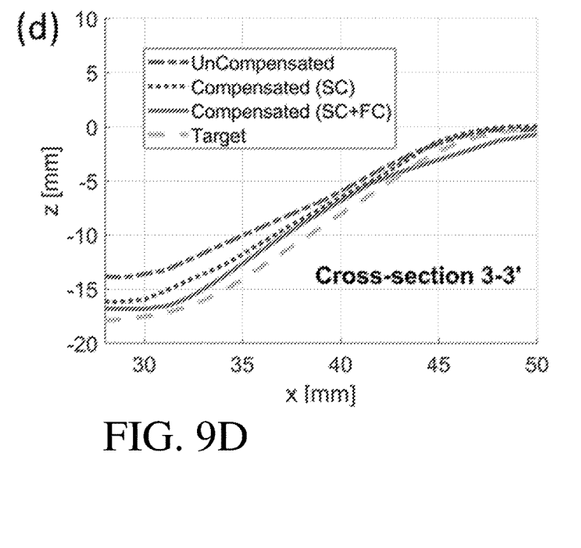
Figure 10A:
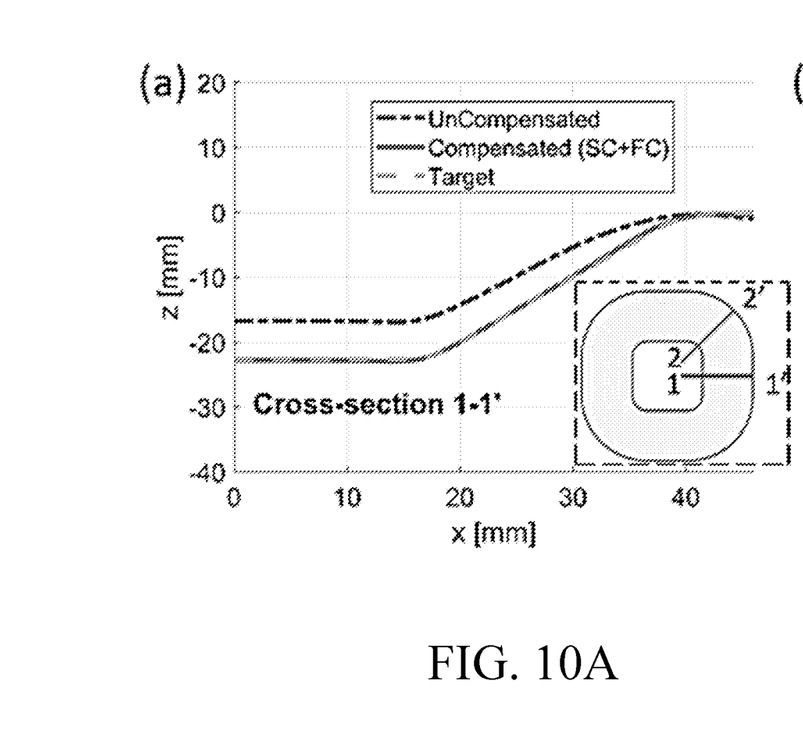
FIG. 10A depicts the cross-section view of the truncated pyramid parts along the x axis.
Figure 10B:
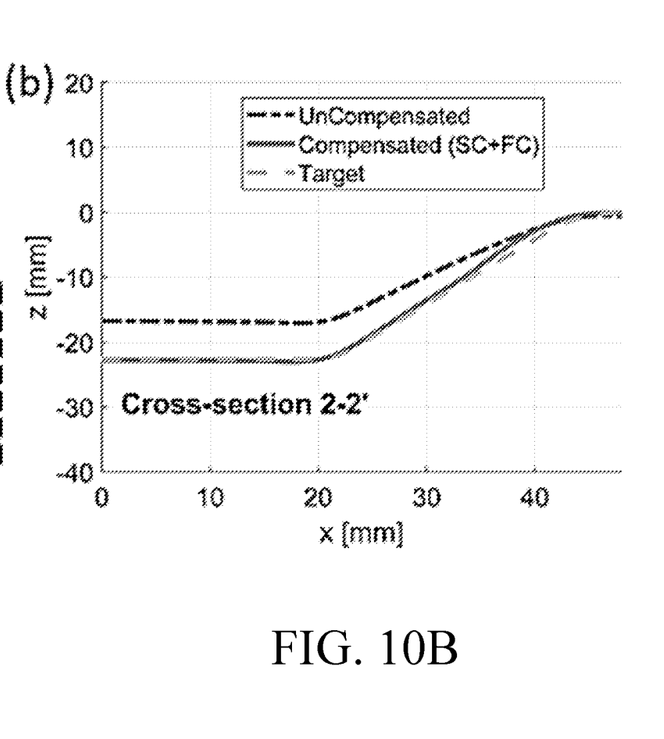
FIG. 10B depicts the cross-section view of the truncated pyramid parts along diagonal axis (450 from x axis).
Figure 11:
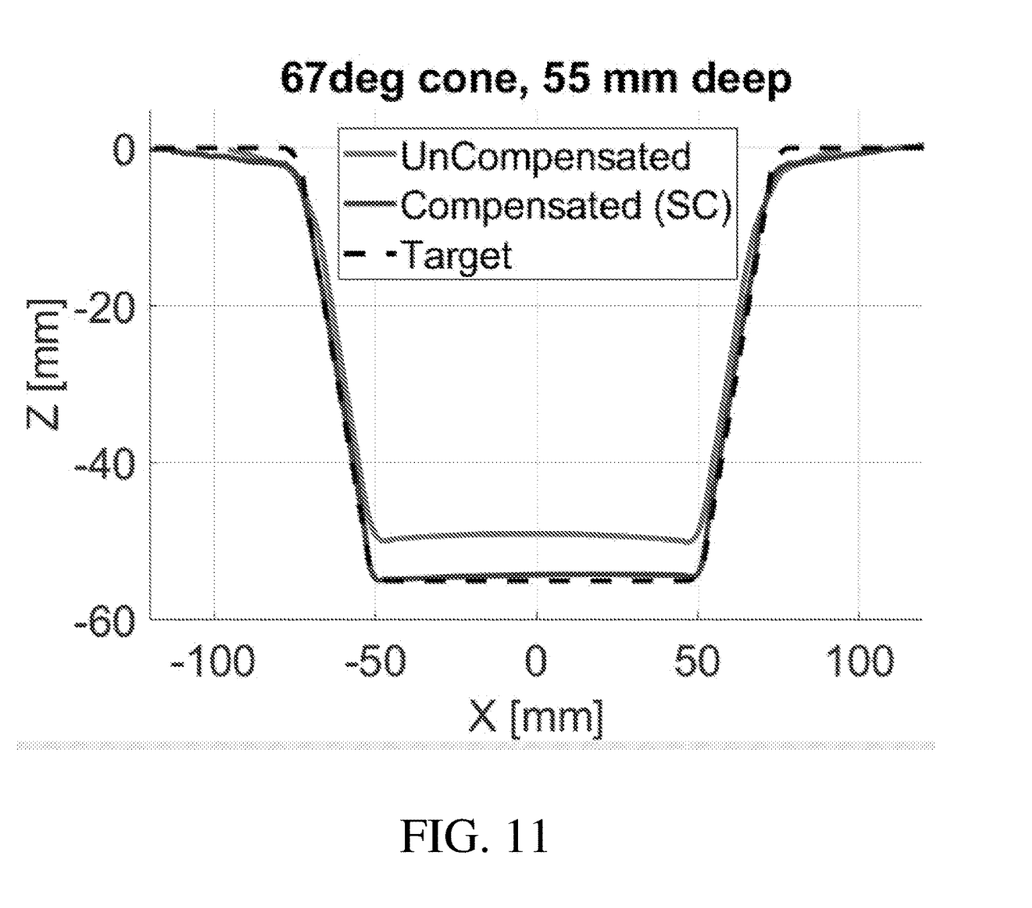
FIG. 11 depicts the cross-section view (x-z plane) of a 67 degree cone.

Table 1 indicates that the compensation method disclosed herein is able to effectively compensate for the geometric deviations in cases with various geometric complexity levels and is compatible with force control. The average error was reduced by almost 3×, down to nearly 1.0 mm. Further illustrations of shape comparisons of cross sections is shown in FIGS. 8-10 for the three geometries. Note that only 'Ref' and 'SC+FC' cases are presented for the pyramid since it is shown from the fish fin case that the performance of this combined method is better than the case with 'SC' only. Another illustration of a shape comparison results of cross sections can be found in FIG. 11 for a 67° cone (results not shown in Table 1).

TABLE 1

| Method | Geometry | | | | | | |
|---|---|---|---|---|---|---|---|
| | Cone | | Fish fin | | | Pyramid | |
| | Ref | SC | Ref | SC | SC + FC | Ref | SC + FC |
| Max. error (mm) | 5.7 | 1.5 | 5.0 | 3.0 | 2.0 | 4.8 | 1.2 |
| Avg. error (mm) | 3.1 | 0.8 | 3.2 | 1.9 | 1.2 | 2.6 | 0.2 |

As observed from the fish fin case in FIGS. 9A-9D, the disclosed method may perform relatively better in the regions with lower curvature in the xy-plane, i.e., sections 2 and 3 are better than section 1. Moreover, the error in the wall region can be effectively compensated, but the bottom region is still compromised by the pillow effect, which may not be due to elastic springback, but some compressive plastic deformation.

In summary, this disclosure generally relates to a generic in-situ springback compensation system and method for an ISF process to minimize geometric errors typically caused by material elasticity. As disclosed herein, the system and method link the measurable variables (i.e., forming tool force and forming tool position) to the desired material characteristics (i.e., in-situ springback displacement) by combining offline simulation-based models with a real-time compensation adjustment of the actual toolpath. As disclosed herein, the effective identification and utilization of a set of finite control points reduces the required computation overhead. Accordingly, the system and method disclosed herein effectively reduces the springback error in the first trial, to include complex geometries, thus achieving a more accurate shape at the end of a forming stage (see Table 1) and after the tools are lifted off the material in an ISF process. Compared to prior art ISF systems and methods, the novel steps of both the offline preparation/predictions, and the online compensation and altering of the toolpath are fully automated. In most examples, the additional equipment may be limited to a force sensor. Furthermore, the proposed springback compensation systems and methods disclosed herein may be used in conjunction with other in-process forming tool force controls to achieve greater geometric accuracy.

As previously discussed, the system and method disclosed herein does not require a geometric scan of a formed part as an intermediate step, thus saving time and minimizing cost. However, the systems and methods disclosed herein may include a geometric scan to further reduce geometric errors if required or desired. One of skill could readily combine the methods and systems disclosed herein with other ISF systems and methods known in the art.

The below references are herein incorporated in their entirety for all purposes.

Ren H, Li F, Moser N, Leem D, Li T, Ehmann K, Cao J (2018) General contact force control algorithm in double-sided incremental forming. CIRP Annals, 67(1): 381-384.

Zhang Z, Zhang H, Shi Y, Moser N, Ren H, Ehmann K, Cao J (2016). Springback reduction by annealing for incremental sheet forming. Procedia Manufacturing, 5:696-706.

Hirt G, Ames J, Bambach M, Kopp R, Kopp R (2004) Forming strategies and process modelling for CNC incremental sheet forming. CIRP Annals, 53(1):203-206.

Fu Z, Mo J, Han F, Gong P (2012) Toolpath correction algorithm for single-point incremental forming of sheet metal. The International Journal of Advanced Manufacturing Technology, 64(9-12):1239-1248.

Allwood J, Music O, Raithathna A, Duncan S (2009) Closed-loop feedback control of product properties in flexible metal forming processes with mobile tools. CIRP Annals, 58(1):87-290.

Kaufman L, Rousseeuw P (2005) Finding groups in data: An introduction to cluster analysis. Hoboken: Wiley Interscience.

Calinski T, Harabasz J (1974) A dendrite method for cluster analysis. Communications in Statistics—Simulation and Computation, 3(1): 1-27.

We claim:

1. A system comprising:
a forming tool configured to deform a material in an incremental forming process to manufacture a product;
a force sensor configured to measure a forming force of the forming tool;
at least one processor; and
at least one memory storing computer executable instructions that, when executed by the at least one processor, cause the system to calculate a predicted springback error of the material, engage the forming tool with the material in the incremental forming process, record the forming force during the incremental forming process, and determine an in-situ compensation, wherein the in-situ compensation is defied as a difference between the predicted springback error and a depth of the material recovered after springback, and wherein the in-situ compensation reduces geometric error in forming the product.

2. The system of claim 1, wherein the material is a metal, a polymer, or a composite.

3. The system of claim 1, wherein the forming tool is further configured to shape a metal, a polymer, or a composite.

4. The system of claim 1, wherein the forming tool is further configured to move along a toolpath comprising a set of toolpath points, wherein the toolpath is determined in part by a geometry of the product.

5. The system of claim 4, wherein the predicted springback error of the material is determined for a plurality of control points, wherein the plurality of control points run along the toolpath.

6. The system of claim 5, wherein the forming force is measured and recorded at each toolpath point, and wherein the in-situ compensation is determined by comparing the forming force to the predicted springback error at a corresponding control point.

7. The system of claim 6, wherein a depth of the toolpath is modified based upon the determined in-situ compensation.

8. The system of claim 1, wherein the incremental forming process is single-point incremental forming.

9. The system of claim 1, wherein the system further includes a supporting tool configured to facilitate double-sided incremental forming.

10. A method of manufacturing a product in an incremental forming process comprising:
providing a forming tool configured to deform a material;
providing a force sensor configured to measure a forming force of the forming tool; and
providing at least one processor configured to execute instructions stored by at least one memory wherein the instructions cause the at least one processor to calculate a predicted springback error of the material, engage the forming tool with the material in the incremental forming process, record the forming force during the incremental forming process, and determine an in-situ compensation, wherein the in-situ compensation is defined as a difference between the predicted springback error and a depth of the material recovered after springback, and wherein the in-situ compensation reduces geometric error in forming the product.

11. The method of claim 10, wherein the material is a metal, a polymer, or a composite.

12. The method of claim 10, wherein the forming tool is further configured to shape a metal, a polymer, or a composite.

13. The method of claim 10, wherein the forming tool is further configured to move along a toolpath comprising a set of toolpath points, wherein the toolpath is determined in part by a geometry of the product.

14. The method of claim 13, wherein the predicted springback error of the material is determined for a plurality of control points, wherein the plurality of control points run along the toolpath.

15. The method of claim 14, wherein the forming force is measured and recorded at each toolpath point, and wherein the in-situ compensation is determined by comparing the forming force to the predicted springback error at a corresponding control point.

16. The method of claim 15, wherein a depth of the toolpath is modified based upon the determined in-situ compensation.

17. The method of claim 10, wherein the incremental forming process is single-point incremental forming.

18. The method of claim 10, wherein the method further includes a supporting tool configured to facilitate double-sided incremental forming.

19. A non-transitory machine-readable medium storing instructions that, when executed by one or more processors, cause the one or more processors to perform steps comprising:
- engage a forming tool with a material to manufacture a product in an incremental forming process;
- record a forming force produced by a forming tool, wherein the forming force is measured by a force sensor;
- calculate a predicted springback error of a material;
- determine an in-situ compensation wherein the in-situ compensation is defined as a difference between the predicted springback error and a depth of the material recovered after springback, and wherein the in-situ compensation reduces geometric error in forming the product.

20. The non-transitory machine-readable medium of claim 19, wherein the instructions further cause the one or more processors to perform steps comprising:
- define a toolpath comprising a set of tool path points, wherein the toolpath is determined in part by a geometry of the product;
- configure the forming tool to move along the toolpath;
- define a plurality of control points wherein the plurality of control points run along the toolpath;
- calculate the predicted the springback error of the material for the plurality of control points;
- record the forming force at each toolpath point;
- compare the forming force at each toolpath point to the predicted springback error at a corresponding control point;
- determine the in-situ compensation; and
- modify a depth of the toolpath based upon the determined in-situ compensation.

* * * * *